United States Patent
Zhu

(10) Patent No.: US 12,507,243 B2
(45) Date of Patent: Dec. 23, 2025

(54) TRANSMISSION SCHEDULING METHOD AND COMMUNICATION DEVICE TRIGGERED BY INDICATION INFORMATION OF AT LEAST TWO SECOND CELLS CONTAINED IN THE INFORMATION FIELD OF A DOWNLINK CONTROL INFORMATION (DCI) AND THE MAPPING RELATIONSHIP BETWEEN THE INDICATION INFORMATION AND THE SECOND CELLS

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 423 days.

(21) Appl. No.: 17/797,618

(22) PCT Filed: Feb. 10, 2020

(86) PCT No.: PCT/CN2020/074663
§ 371 (c)(1),
(2) Date: Aug. 4, 2022

(87) PCT Pub. No.: WO2021/159252
PCT Pub. Date: Aug. 19, 2021

(65) Prior Publication Data
US 2023/0069308 A1    Mar. 2, 2023

(51) Int. Cl.
*H04W 72/232* (2023.01)
*H04L 1/00* (2006.01)
(Continued)

(52) U.S. Cl.
CPC .......... *H04W 72/23* (2023.01); *H04L 1/0027* (2013.01); *H04L 5/0053* (2013.01); *H04L 47/62* (2013.01);
(Continued)

(58) Field of Classification Search
CPC . H04W 72/23; H04W 72/231; H04W 72/232; H04W 72/12; H04W 72/1226;
(Continued)

(56) References Cited

U.S. PATENT DOCUMENTS

2013/0094442 A1    4/2013  Kim et al.
2014/0003356 A1*   1/2014  Wang ............... H04W 72/23
                                                      370/329
(Continued)

FOREIGN PATENT DOCUMENTS

CN    102549944 A    7/2012
CN    103959730 A    7/2014

OTHER PUBLICATIONS

R1-1908876, "Discussion on fast activation and deactivation of Scell", Aug. 26-30, 2019, pp. 1-3 (Year: 2019).*
(Continued)

*Primary Examiner* — Salvador E Rivas
(74) *Attorney, Agent, or Firm* — Finnegan, Henderson, Farabow, Garrett & Dunner, L.L.P.

(57) ABSTRACT

A transmission scheduling method includes: sending in a first cell, downlink control information (DCI) for scheduling data transmission in at least two second cells.

9 Claims, 12 Drawing Sheets

(51) Int. Cl.
*H04L 5/00* (2006.01)
*H04L 47/62* (2022.01)
*H04W 72/12* (2023.01)
*H04W 72/1263* (2023.01)
*H04W 72/23* (2023.01)
*H04W 72/231* (2023.01)
*H04W 72/50* (2023.01)

(52) U.S. Cl.
CPC ....... *H04W 72/12* (2013.01); *H04W 72/1263* (2013.01); *H04W 72/231* (2023.01); *H04W 72/232* (2023.01); *H04L 5/001* (2013.01); *H04W 72/50* (2023.01)

(58) Field of Classification Search
CPC  H04W 72/1278; H04W 72/50; H04L 5/0053; H04L 5/0044; H04L 5/0098; H04L 5/001; H04L 47/62; H04L 1/0027
See application file for complete search history.

(56) References Cited

U.S. PATENT DOCUMENTS

| | | | |
|---|---|---|---|
| 2014/0036828 A1 | 2/2014 | Papasakellariou et al. | |
| 2014/0198678 A1* | 7/2014 | Kim | H04L 1/20 370/252 |
| 2015/0110032 A1* | 4/2015 | Nagata | H04W 72/23 370/329 |
| 2015/0280882 A1* | 10/2015 | Lee | H04L 5/001 370/329 |
| 2016/0227524 A1* | 8/2016 | Choi | H04L 5/00 |
| 2016/0254948 A1 | 9/2016 | Chen et al. | |
| 2018/0014287 A1 | 1/2018 | Papasakellariou et al. | |
| 2018/0254876 A1 | 9/2018 | Dinan | |
| 2019/0223162 A1* | 7/2019 | Suzuki | H04W 76/28 |
| 2019/0349806 A1* | 11/2019 | Nam | H04L 5/001 |
| 2021/0307053 A1* | 9/2021 | Wang | H04W 72/23 |
| 2022/0061066 A1* | 2/2022 | Zhou | H04W 76/27 |
| 2022/0166538 A1* | 5/2022 | Miao | H04L 5/0051 |
| 2022/0225371 A1* | 7/2022 | Seo | H04W 72/1273 |
| 2023/0040333 A1* | 2/2023 | Xu | H04L 25/0238 |
| 2023/0048526 A1* | 2/2023 | Harada | H04W 72/23 |
| 2023/0056409 A1* | 2/2023 | Yuan | H04W 52/143 |
| 2023/0060481 A1* | 3/2023 | Yuan | H04L 5/0057 |
| 2023/0085896 A1* | 3/2023 | Takeda | H04L 5/0044 |
| 2023/0171785 A1* | 6/2023 | Ma | H04W 36/06 370/329 |

OTHER PUBLICATIONS

Examination report for Indian Application No. 202247050917, issued on Mar. 1, 2023, 12 pages.
European Patent Office, Extended European Search Report issued in Application No. 20918262.5, dated Oct. 10, 2023, 10 pages.
Ericsson, "Multi-RAT Dual-Connectivity and Carrier Aggregation enhancements", 3GPP TSG RAN meeting #86, RP-192402, Sitges, Spain, Dec. 9-12, 2019, 40 pages.

* cited by examiner

TRANSMISSION SCHEDULING METHOD AND COMMUNICATION DEVICE TRIGGERED BY INDICATION INFORMATION OF AT LEAST TWO SECOND CELLS CONTAINED IN THE INFORMATION FIELD OF A DOWNLINK CONTROL INFORMATION (DCI) AND THE MAPPING RELATIONSHIP BETWEEN THE INDICATION INFORMATION AND THE SECOND CELLS

CROSS-REFERENCE TO RELATED APPLICATION

This application is the US national phase application of International Application No. PCT/CN2020/074663, filed on Feb. 10, 2020, the entire content of which is incorporated herein by reference.

TECHNICAL FIELD

The present disclosure relates to the field of wireless communication technologies, but is not limited to the field of wireless communication technologies, and in particular, relates to a transmission scheduling method and apparatus, a communication device, and a storage medium.

BACKGROUND

The continuous emergence of new Internet application technologies such as a new generation of augmented reality (AR), virtual reality (VR), and vehicle-to-vehicle communication has put forward higher requirements for wireless communication technology, driving the continuous development of wireless communication technology to meet the requirements of the application. Cellular mobile communication technology is in the evolution stage of a new generation technology. An important feature of the new generation technology is to support flexible configuration of multiple service types. Different service types have different requirements for wireless communication technology. For example, the Enhanced Mobile Broadband (eMBB) service type mainly focuses on heavy bandwidth, high speed and other requirements; the Ultra Reliable Low Latency Communication (URLLC) service type mainly focuses on higher reliability, low latency and other requirements; the Massive Machine Type Communication (mMTC) service type mainly focuses on a large number of connections and other requirements. Therefore, a new generation of wireless communication systems requires flexible and configurable designs to support transmission of multiple service types.

SUMMARY

According to a first aspect of embodiments of the present disclosure, a transmission scheduling method is provided. The method includes:
sending in a first cell, downlink control information (DCI) for scheduling data transmission in at least two second cells.

According to a second aspect of embodiments of the present disclosure, a transmission scheduling method is provided. The method includes:
receiving a downlink control information (DCI) sent in a first cell and configured to schedule data transmission in at least two second cells;
performing data transmission in the at least two second cells according to the DCI information.

According to a third aspect of embodiments of the present disclosure, a communication device is provided, including:
an antenna;
a memory; and
a processor, connected to the antenna and the memory respectively, and configured to control transmitting and receiving of the antenna and implement the method provided by any above technical solution, by executing computer executable instructions stored in the memory.

DETAILED DESCRIPTION

Embodiments will be described in detail herein, examples of which are illustrated in the accompanying drawings. Where the following description refers to the drawings, the same numerals in different drawings refer to the same or similar elements unless otherwise indicated. The implementations described in the embodiments below are not intended to represent all implementations consistent with this disclosure. Rather, they are merely examples of apparatus and methods consistent with some aspects of the present disclosure as recited in the appended claims.

The terms used in the embodiments of the present disclosure are only for the purpose of describing particular embodiments, and are not intended to limit the embodiments of the present disclosure. As used in the embodiments of the present disclosure and the appended claims, the singular forms "a," "the," and "said" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the words "if" as used herein can be interpreted as "in a case of" or "when" or "in response to determining."

Figure 1:
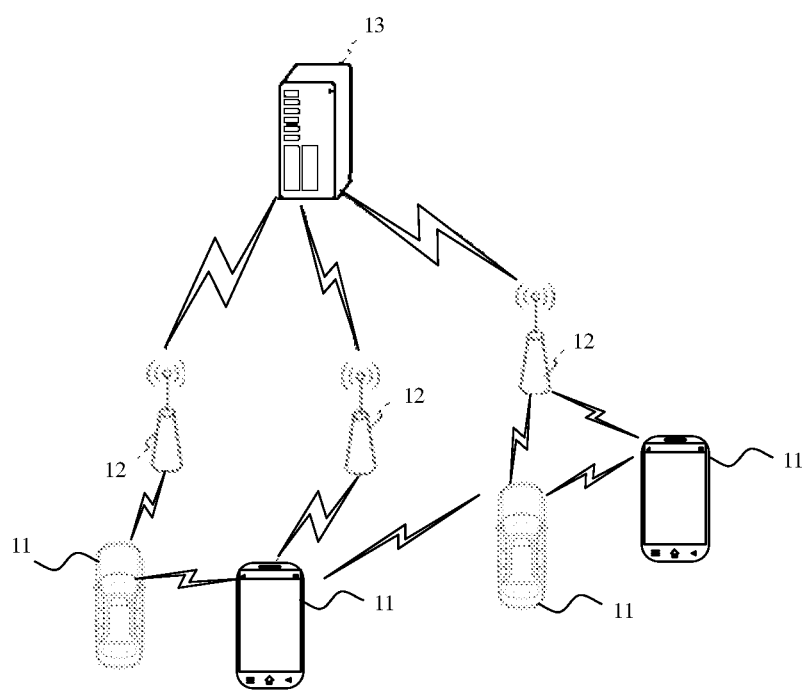
FIG. 1 is a schematic diagram of a wireless communication system according to an embodiment of the present disclosure.

Please refer to FIG. 1, which shows a schematic diagram of a wireless communication system provided by an embodiment of the present disclosure. As shown in FIG. 1, the wireless communication system is a communication system based on cellular mobile communication technology, and the wireless communication system may include: several terminals 11 and several base stations 12.

The terminal 11 may be a device that provides voice and/or data connectivity to the user. The terminal 11 may communicate with one or more core networks via a Radio Access Network (RAN), and the terminal 11 may be an IoT terminal such as a sensor device, a mobile phone (or "cellular" phone) and a computer of the IoT terminal, for example, may be a fixed, portable, pocket, hand-held, computer built-in or a vehicle-mounted device, for example, Station (STA), subscriber unit, subscriber station, mobile station, mobile, remote station, access point, remote terminal, access terminal, user terminal, user agent, user device, or user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device externally connected to the trip computer. Alternatively, the terminal 11 may also be a roadside device, for example, a street light, a signal light, or other roadside devices with a wireless communication function.

The base station 12 may be a network-side device in the wireless communication system. The wireless communication system may be the 4th generation mobile communication (4G) system, also known as Long Term Evolution (LTE) system; or, the wireless communication system may also be a 5G system, also known as new radio (NR) system or 5G NR system. Alternatively, the wireless communication system may also be a next-generation system of the 5G system. The access network in the 5G system may be called NG-RAN (New Generation-Radio Access Network). Alternatively, the wireless communication system is the MTC system.

The base station 12 may be an evolved base station (eNB) used in the 4G system. Alternatively, the base station 12 may also be a base station (gNB) that adopts a centralized-distributed architecture in the 5G system. When the base station 12 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; a physical (PHY) layer protocol stack is provided in the distributed unit, and the specific implementation of the base station 12 is not limited in embodiments of the present disclosure.

A wireless connection can be established between the base station 12 and the terminal 11 through a radio air interface. In different embodiments, the radio air interface is a radio air interface based on the fourth generation mobile communication network technology (4G) standard; or, the radio air interface is a radio air interface based on the fifth generation mobile communication network technology (5G) standard, such as a new air interface; or, the radio air interface may also be a radio air interface based on a next-generation mobile communication network technology standard of 5G.

In some embodiments, an E2E (End to End) connection may also be established between the terminals 11, for example, in scenarios such as V2V (vehicle to vehicle) communication, V2I (vehicle to Infrastructure) communication and V2P (vehicle to pedestrian) communication in V2X (vehicle to everything) communication.

In some embodiments, the above wireless communication system may further include a network management device 13.

Several base stations 12 are respectively connected to the network management device 13. The network management device 13 may be a core network device in the wireless communication system. For example, the network management device 13 may be a mobility management entity (MME) in an evolved packet core (EPC) network. Alternatively, the network management device may also be other core network devices, such as a serving gateway (SGW), a public data network gateway (PGW), a policy and charging rules function (PCRF) or home subscriber server (HSS), etc. The implementation form of the network management device 13 is not limited in embodiments of the present disclosure.

In order to better understand the technical solutions described in any embodiment of the present disclosure, first, a scenario in which multiple communication systems coexist is described through an embodiment.

Figure 2:
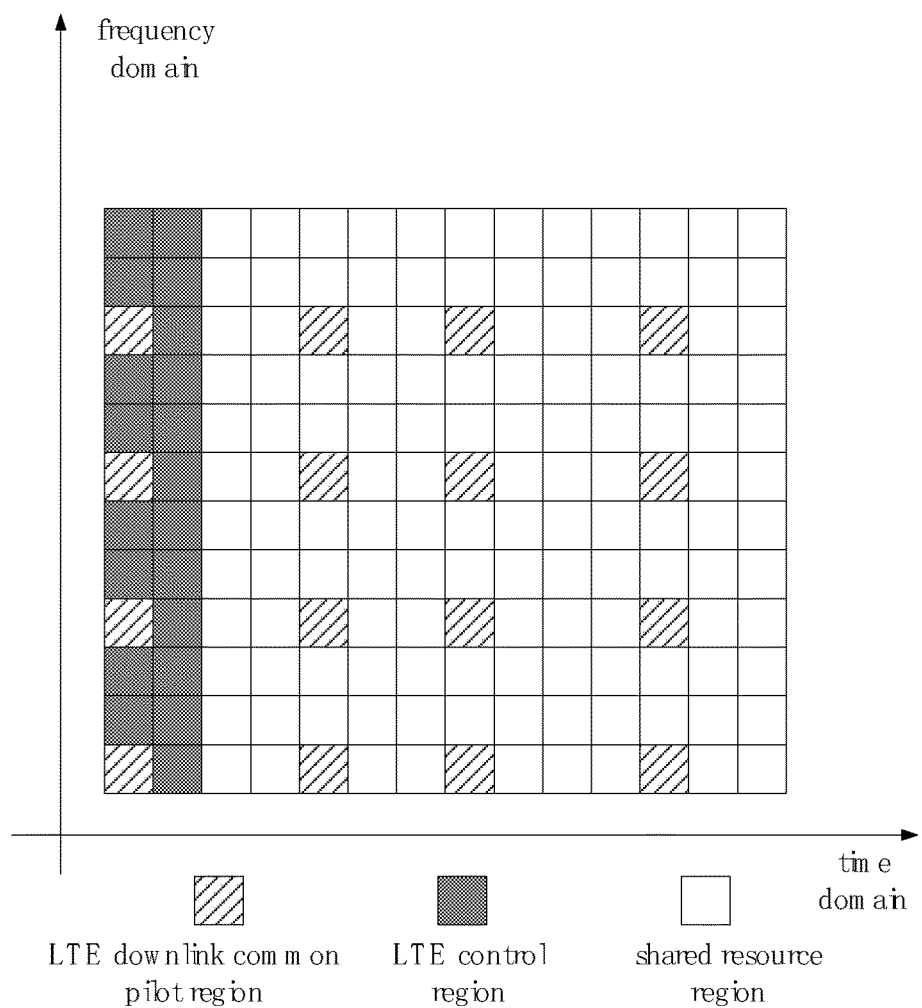
FIG. 2 is a schematic diagram of a scenario in which an LTE system and a 5G new radio system coexist according to an embodiment of the present disclosure.

As shown in FIG. 2, an embodiment of the present disclosure provides a scenario in which an LTE system and a 5G NR system coexist. In the frequency band where the LTE system and the 5G NR system coexist, in order to ensure the normal operation of the LTE system, the resources occupied by the LTE system channel will be reserved, for example, the LTE downlink common pilot region in FIG. 2 and the LTE control region in FIG. 2. In this case, the resources that can be used by the 5G NR system will be relatively less.

In an embodiment, based on the carrier aggregation technology, a scheduling instruction in one cell can be implemented to schedule data transmission in another cell. However, in this embodiment, one scheduling instruction can only schedule data transmission within one cell. For the scenario where the LTE system and the 5G NR system coexist, the problem of limited control resources of the 5G NR system cannot be solved.

Figure 3:
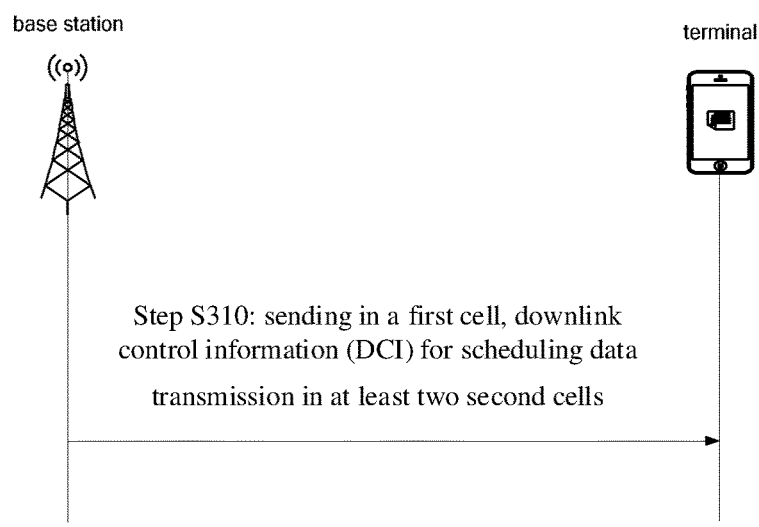
FIG. 3 is a schematic diagram of a transmission scheduling method provided by an embodiment of the present disclosure.

As shown in FIG. 3, an embodiment of the present disclosure provides a transmission scheduling method. The method includes:

step S310, sending, in a first cell, downlink control information (DCI) for scheduling data transmission in at least two second cells.

In an embodiment, when the base station sends DCI to the UE, first, the UE receives the DCI sent by the base station. The DCI is configured to indicate the UE at least one of the following: how to receive downlink data sent by the base station, how to send uplink data to the base station, and how to adjust the transmit power. Secondly, after the UE receives the DCI, the UE performs data transmission according to indication of the DCI. Here, the data transmission may be sending uplink data to the base station, or may be receiving downlink data sent by the base station.

In an embodiment, each cell may be configured with one carrier. Different cells use different carriers to achieve wireless signal coverage in the cells and complete data transmission in the cells. For example, cell A uses carrier 1 to implement wireless signal coverage in the cell, and cell B uses carrier 2 to implement wireless signal coverage in the cell.

In an embodiment, the second cells may be cells different from the first cell. For example, the first cell is the cell A, and the two second cells are cell B and cell C, respectively. In another embodiment, the second cells may include the first cell. For example, the first cell is the cell A, and the two second cells are the cell A and the cell B, respectively.

In embodiments of the present disclosure, by sending one DCI in the first cell, data transmission can be scheduled in at least two second cells, which, compared to the case in which one DCI can only schedule data transmission in one cell, can effectively reduce the overhead of control signaling in the wireless communication process, and can improve the utilization rate of wireless resources.

Figure 4:
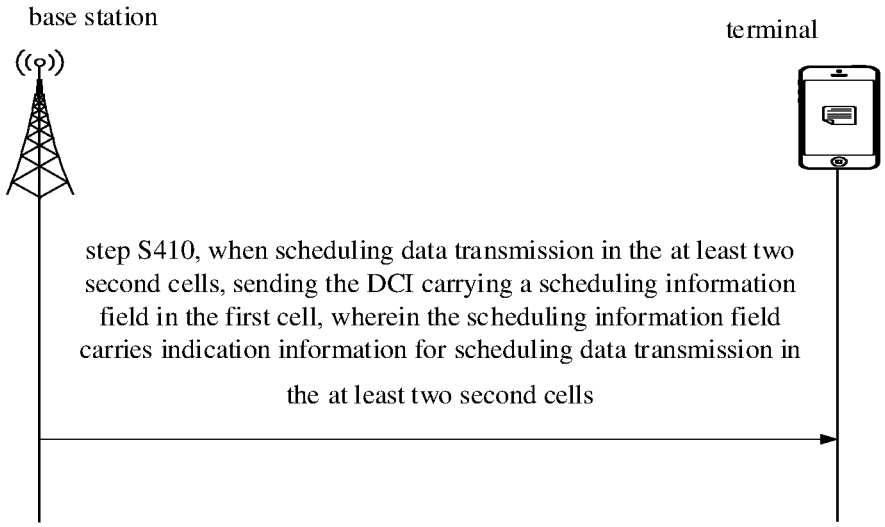
FIG. 4 is a schematic diagram of a transmission scheduling method provided by another embodiment of the present disclosure.

As shown in FIG. 4, another embodiment of the present disclosure provides a transmission scheduling method. In step S310, sending in the first cell, the DCI for scheduling data transmission in at least two second cells includes:

step S410, when data transmission is scheduled to be performed in at least two second cells, sending the DCI carrying a scheduling information field in the first cell, wherein the scheduling information field carries indication information of scheduling data transmission in the at least two second cells.

In an embodiment, the indication information may include identification information of the second cells.

In an embodiment, the scheduling information field is located at a fixed position of the DCI;

or, an information field length of the scheduling information field is a fixed length;

or, the scheduling information field is located at a fixed position of the DCI, and an information field length of the scheduling information field is a fixed length.

In an embodiment, the DCI occupies N bits, and the numbers of the bits are from the 1st to the Nth in sequence, and the scheduling information field may occupy the bits numbered from the Qth to the Pth in the N bits. N>P>Q>0, and N, P, and Q are positive integers. Here, N, P, and Q can be set to fixed values. In this case, the scheduling information field is located at the fixed position of the DCI, and the information field length of the scheduling information field is the fixed length. For example, N=12; P=6; Q=3: then the scheduling information field is located at the fixed position of the bits numbered 3 to 6 occupied by the DCI, and the information field length of the scheduling information field is 4.

Here, since the scheduling information field is located at the fixed position of the DCI and/or the information field length of the scheduling information field is the fixed length, when the UE receives the DCI, it can quickly and accurately locate the position of the scheduling information field in the DCI and determine the length of the scheduling information field, and obtain from the scheduling information field, the indication information for scheduling data transmission in at least two second cells. In this way, the scheduling information field is located at the fixed position of the DCI and/or the information field length of the scheduling information field is the fixed length, which can simplify DCI decoding and improve the decoding efficiency.

In an embodiment, the base station may send the information that the scheduling information field is located at the fixed position of the DCI and/or the information of the information field length of the scheduling information field to the UE in advance.

In another embodiment, the UE acquires at least one of the position or the length information of the scheduling information field through a predefined method. For example, at least one of the position or the length of the scheduling information field in the DCI may be preset in the communication protocol, and the terminal may determine at least one of the position or the length of the scheduling information field in the DCI according to the type of communication protocol used during communication.

Figure 5:
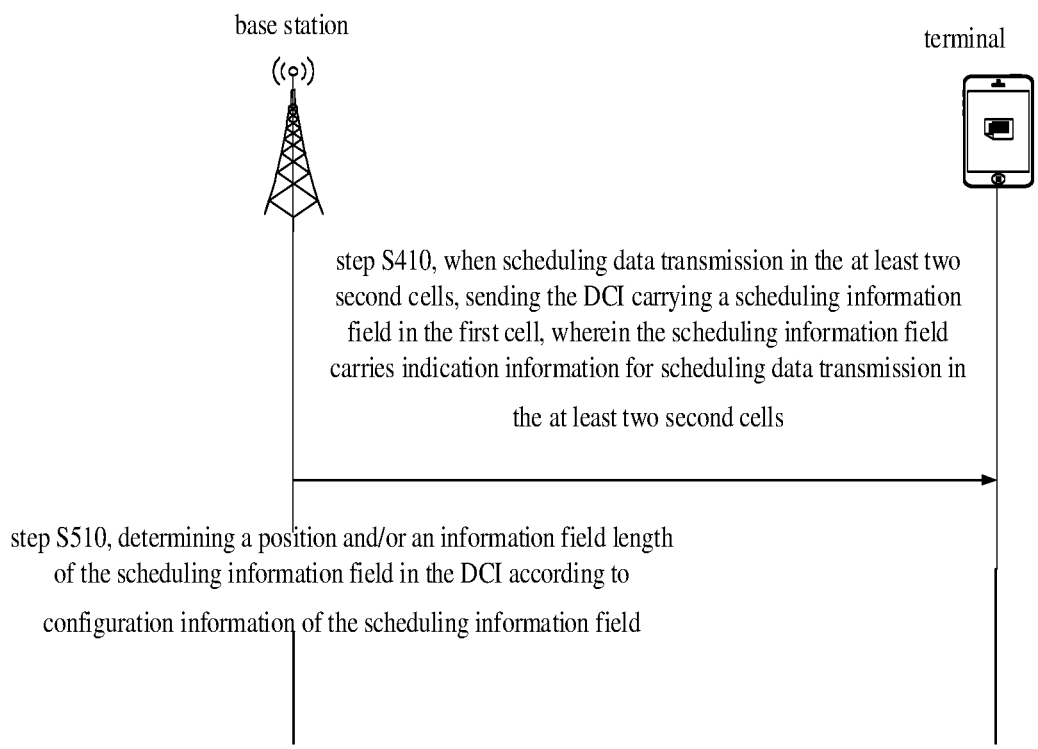
FIG. 5 is a schematic diagram of a transmission scheduling method provided by another embodiment of the present disclosure.

As shown in FIG. 5, another embodiment of the present disclosure provides a transmission scheduling method, and the method further includes:

step S510, according to configuration information of the scheduling information field, determining at least one of the position or the information field length of the scheduling information field in the DCI.

In an embodiment, the configuration information may indicate a start position and an end position of the scheduling information field. For example, DCI occupies 12 bits, the configuration information indicates that the starting position of the scheduling information field is the bit numbered 6, and the end position of the indicating scheduling information field is the bit numbered 9. Here, the information field occupies a length of 4 bits.

In an embodiment, the configuration information may indicate the starting position of the scheduling information field and the length of the scheduling information field. For example, the DCI occupies 12 bits, the configuration information indicates that the starting position of the scheduling information field is the bit numbered 6, and the configuration information indicates that the length of the scheduling information field occupies 4 bits.

In an embodiment, at least one of the position or the information field length of the scheduling information field in the DCI may be dynamically configured according to the configuration information based on the application scenario. In this way, the configuration of the scheduling information field is made more flexible, and the utilization rate of each bit in the DCI is improved. For example, when scheduling data transmission in 2 second cells, only 2 bits need to be configured in the scheduling information field, when scheduling data transmission in 3 second cells, 3 bits need to be configured in the scheduling information field.

In an embodiment, the UE supports scheduling data transmission in 4 cells. In an application scenario, if one DCI is set to schedule the UE to perform data transmission in 2 cells, the configuration information can configure that the information field length of the scheduling information field in the DCI is 2 bits in length. In another application scenario, if one DCI is set to schedule the UE to perform data transmission in 3 cells, the configuration information may configure that the information field length of the scheduling information field in the DCI is 3 bits in length.

In an embodiment, the scheduling information field includes:

a bitmap, wherein one bit in the bitmap is configured to indicate whether one second cell is scheduled for data transmission.

In an embodiment, the bitmap includes 4 bits, the first bit is configured to indicate whether cell 1 is scheduled; the second bit is configured to indicate whether cell 2 is scheduled; the third bit is configured to indicate whether cell 3 is scheduled; the fourth bit is configured to indicate whether cell 4 is scheduled. When the bit value is "0", the corresponding cell is not scheduled; when the bit value is "1", the corresponding cell is scheduled. Please refer to Table 1, which shows the relationship between the values of the 4 bits and whether the cell is scheduled.

TABLE 1

| bit | bit value | cell scheduling |
| --- | --- | --- |
| the first bit | 0 | cell 1 is not scheduled |
| the first bit | 1 | cell 1 is scheduled |
| the second bit | 0 | cell 2 is not scheduled |
| the second bit | 1 | cell 2 is scheduled |
| the third bit | 0 | cell 3 is not scheduled |
| the third bit | 1 | cell 3 is scheduled |
| the fourth bit | 0 | cell 4 is not scheduled |
| the fourth bit | 1 | cell 4 is scheduled |

Figure 6:
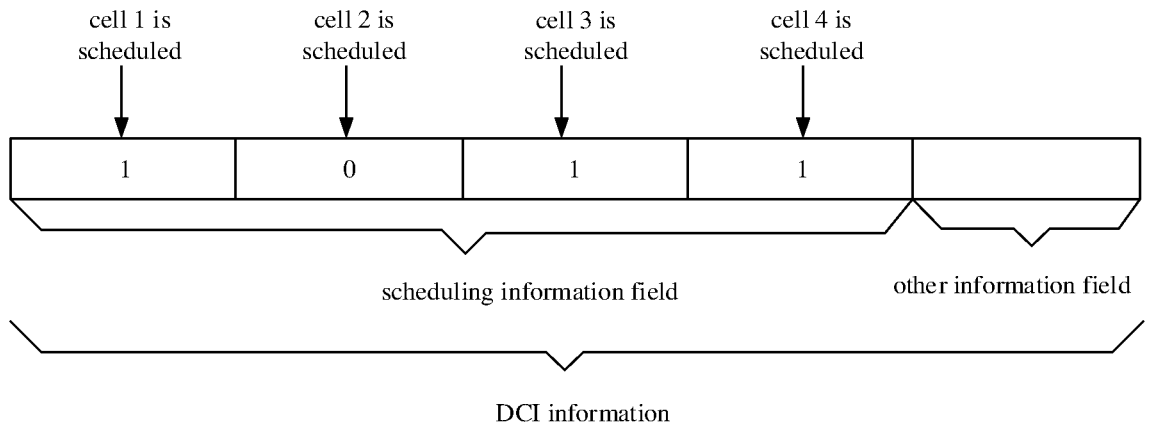
FIG. 6 is a schematic diagram of a scheduling information field provided by an embodiment of the present disclosure.

In an embodiment, referring to FIG. 6, the values of the 4 bits of the bitmap are "1", "0", "1", and "1" respectively, which are used to indicate that data transmission is scheduled to be performed in cell 1, cell 3 and cell 4, which are in a total of 3 cells. Cell 2 is not scheduled.

Figure 7:
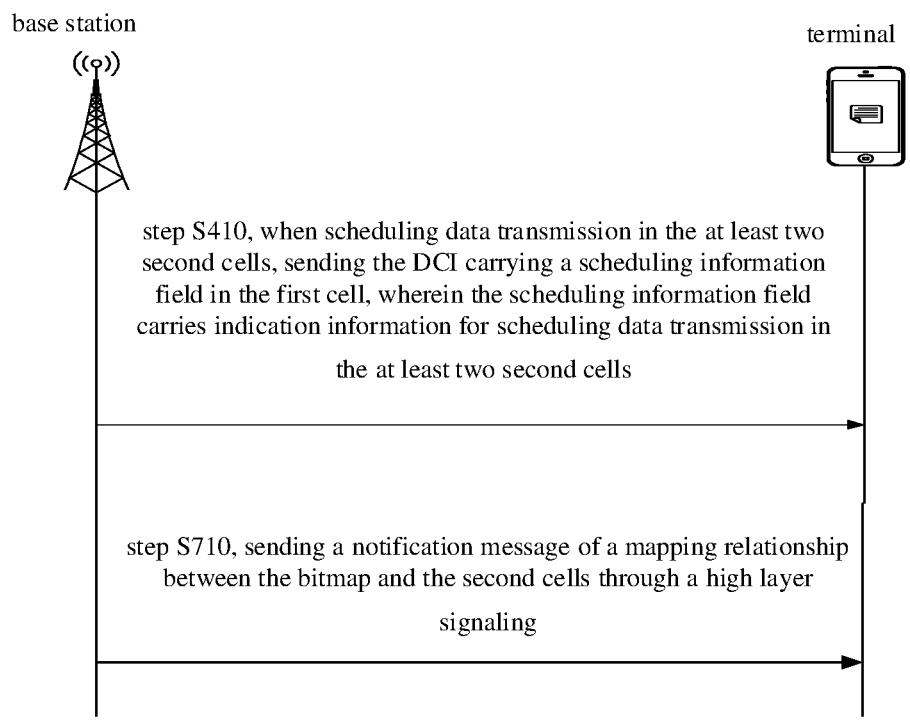
FIG. 7 is a schematic diagram of a transmission scheduling method provided by another embodiment of the present disclosure.

As shown in FIG. 7, another embodiment of the present disclosure provides a transmission scheduling method. The method further includes:

step S710, sending a notification message of the mapping relationship between the bitmap and the second cells through a high layer signaling.

In an embodiment, the high layer signaling may carry encoded information of the mapping relationship between the bitmap and the second cells. For example, the encoded information occupies 4 bits. When the encoded information is "0001", it is used to indicate: the first bit indicates cell 1; the second bit indicates cell 2; the third bit indicates cell 3; the fourth bit indicates cell 4; wherein. Cell 1, Cell 2, Cell 3, and Cell 4 belong to the second cells. In this way, the UE can determine the mapping relationship between respective bits of the bitmap and the second cells after receiving the high layer signaling, and determine whether to schedule the second cell for data transmission based on the mapping relationship.

In an embodiment, the high layer signaling may be signaling of a radio resource control (RRC) layer or signaling of a media access control (MAC) layer, for example, a RRC signaling, a MAC Control Element (CE) signaling, etc.

In an embodiment, the scheduling information field includes:

indication information of each second cell.

Figure 8:
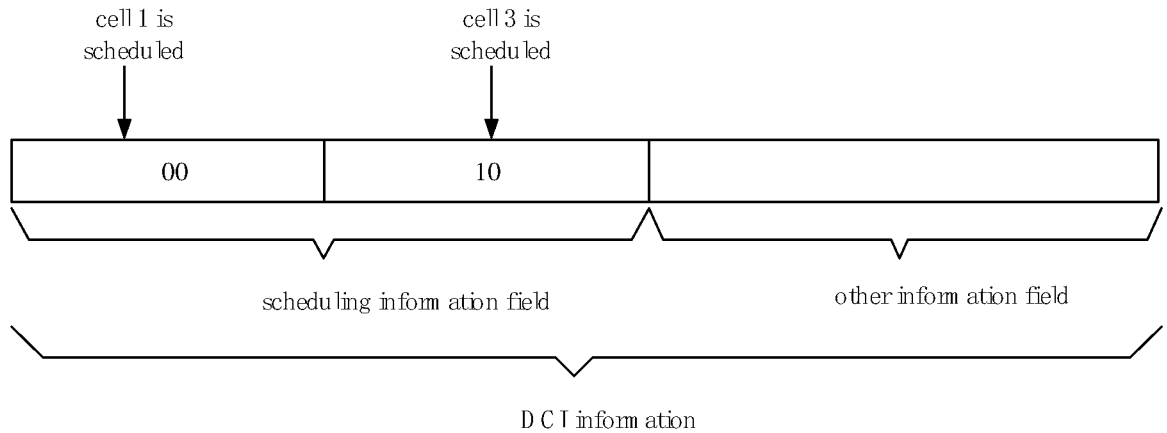
FIG. 8 is a schematic diagram of a scheduling information field provided by another embodiment of the present disclosure.

In an embodiment, the indication information may be identification information of the scheduled second cell carried in the scheduling information field. In an embodiment, the identification information of cell 1 is "00", the identification information of cell 2 is "01", the identification information of cell 3 is "10", and the identification information of cell 4 is "11", and when the cells are scheduled, the scheduling information field may directly carry the identification information corresponding to the cells. Please refer to FIG. 8, the identification information of cell 1 is "00", and the identification information of cell 3 is "10". When cell 1 and cell 3 are scheduled, the scheduling information field can directly carry the identification information "00" of cell 1 and the identification information "10" of cell 3. Here, the indication information may indicate the terminal to perform data transmission in cell 1 and cell 3.

Figure 9:
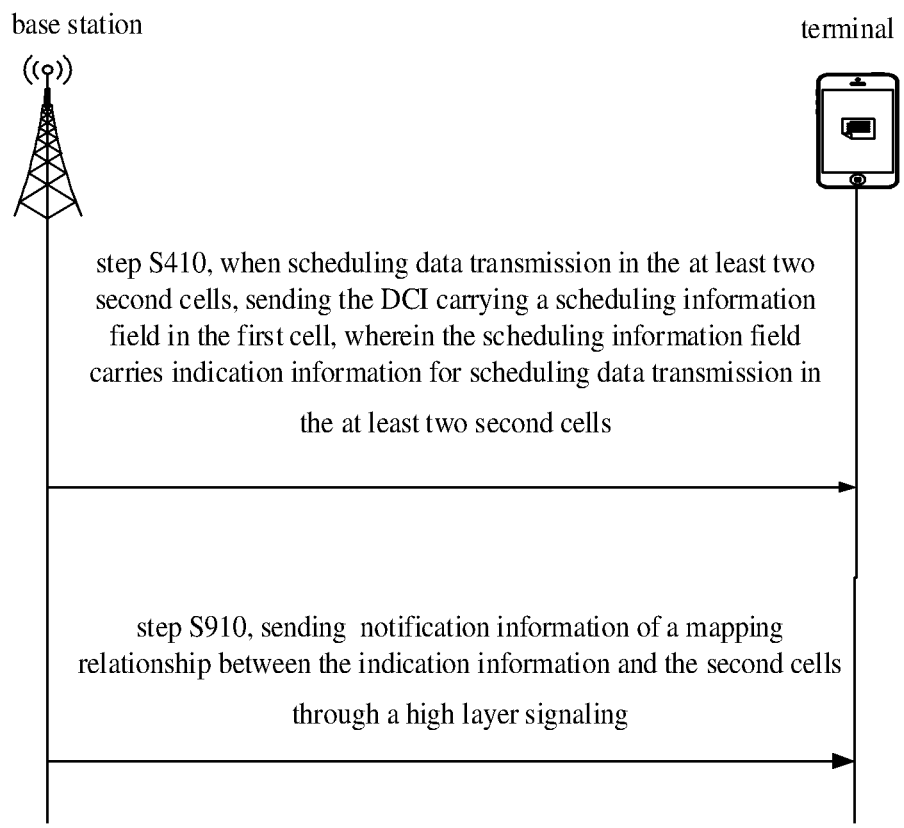
FIG. 9 is a schematic diagram of a transmission scheduling method provided by another embodiment of the present disclosure.

As shown in FIG. 9, another embodiment of the present disclosure provides a transmission scheduling method, and the method further includes:

step S910, sending the notification message of the mapping relationship between the indication information and the second cells through the higher layer signaling.

In an embodiment, the terminal supports data transmission in four second cells, and one DCI schedules the UE to perform data transmission in two second cells at most. The UE may learn which second cells are scheduled to perform data transmission based on the mapping relationship between the indication information and the second cells. Here, the base station uses the high layer signaling notification method, and after receiving the high layer signaling, the UE can learn the mapping relationship between the indication information and the second cells.

Here, the UE can determine the mapping relationship between the indication information and the second cells after receiving the high layer signaling, and determine to schedule the corresponding second cells for data transmission based on the mapping relationship.

In an embodiment, the mapping relationship includes:

a first type of mapping relationship, wherein one indication information map to one second cell;

a second type of mapping relationship, wherein one indication information map to one or more second cells.

In an embodiment, referring to Table 2, when the value of the scheduling information field includes "00", the indication information indicates that cell 1 is scheduled; when the value of the scheduling information field includes "01", the indication information indicates that cell 2 is scheduled; when the value of the scheduling information field includes "10", the indication information indicates that cell 3 is scheduled; when the value of the scheduling information field includes "11", the indication information indicates that cell 4 is scheduled; wherein, all of cell 1, cell 2, cell 3 and cell 4 are the second cells.

TABLE 2

| information field value included in the scheduling information field | indication information |
|---|---|
| 00 | cell 1 is scheduled |
| 01 | cell 2 is scheduled |
| 10 | cell 3 is scheduled |
| 11 | cell 4 is scheduled |

In an embodiment, please refer to Table 3. When the value of the scheduling information field includes "000", the indication information indicates that cell 1 is scheduled; when the value of the scheduling information field includes "001", the indication information indicates that cell 2 is scheduled; when the value of the scheduling information field includes "010", the indication information indicates that cell 3 is scheduled; when the value of the scheduling information field incudes "011", the indication information indicates that cell 4 is scheduled; when the value of the scheduling information field includes "100", the indication information indicates that cell 1 and cell 2 are scheduled; when the value of the scheduling information field includes "101", the indication information indicates that cell 1 and cell 3 are scheduled; when the value of the scheduling information field includes "110", the indication information indicates that cell 1 and cell 4 are scheduled; when the value of the scheduling information field includes "111", the indication information indicates that cell 2 and cell 3 are scheduled. Cell 1, cell 2, cell 3 and cell 4 are the second cells.

TABLE 3

| information field value included in the scheduling information field | indication information |
|---|---|
| 000 | cell 1 is scheduled |
| 001 | cell 2 is scheduled |
| 010 | cell 3 is scheduled |
| 011 | cell 4 is scheduled |
| 100 | cell 1 and cell 2 are scheduled |
| 101 | cell 1 and cell 3 are scheduled |
| 110 | cell 1 and cell 4 are scheduled |
| 111 | cell 2 and cell 3 are scheduled |

In one embodiment, the number of bits occupied by each second cell in the scheduling information field may be determined based on how many second cells the UE supports to transmit data in or how many second cells one DCI schedules the UE to perform data transmission in at most.

Figure 10:
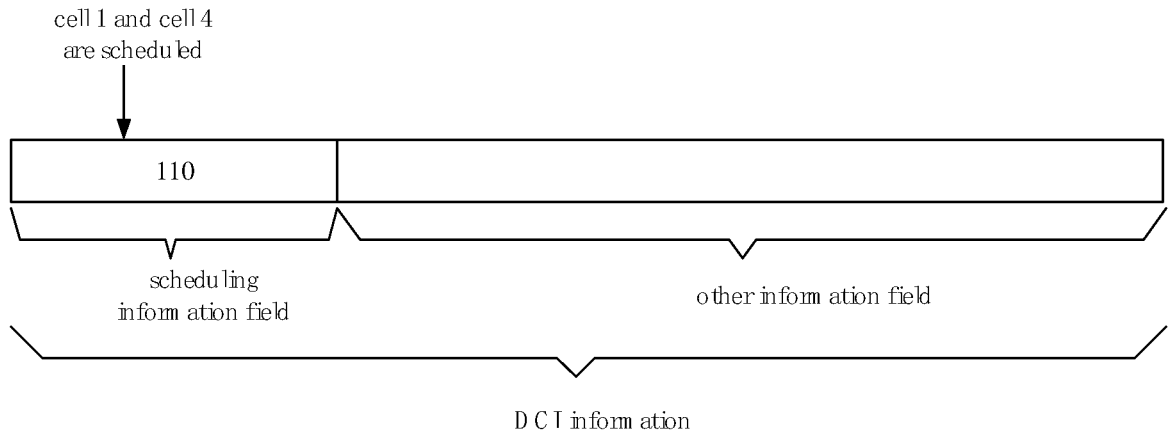
FIG. 10 is a schematic diagram of a scheduling information field provided by another embodiment of the present disclosure.

Referring to FIG. 10, in one embodiment, the value of the scheduling information field in the DCI includes "110", and the indication information indicates that cell 1 and cell 4 are scheduled.

Here, the information contained in the scheduling information field is coded in the manner of joint coding of multiple cells, which can greatly reduce the number of occupied bits compared with the manner of coding for each cell individually. For example, in the coding method shown in Table 3, 8 different cell information can be represented by only occupying 3 bits. If each cell is individually coded, representing the above 8 different cell information may require at least 4 bits.

In one embodiment, the scheduling information field includes:
    grouping information, configured to indicate one or more cell groups; wherein, one cell group includes one or more second cells.

In one embodiment, referring to Table 4, when the information field value included in the scheduling information field is "00", the grouping information indicates that data transmission is scheduled to be performed in cell 1 and cell 2 included in the cell group with group number 1; when the information field value contained in the scheduling information field is "01", the grouping information indicates that data transmission is scheduled to be performed in cell 3 and cell 4 contained in the cell group with group number 2; when the information field value contained in the scheduling information field is "10", the grouping information indicates that the data transmission is scheduled in the cell 1 and cell 4 included in the cell group with the group number 3; when the information field value contained in the scheduling information field is "11", the grouping information indicates that data transmission is scheduled to be performed in the cell 2 and the cell 3 included in the cell group with the group number 4; wherein, the cell 1, the cell 2, the cell 3 and the cell 4 are the second cells.

TABLE 4

| information field value included in the scheduling information field | group number | grouping information |
|---|---|---|
| 00 | 1 | cell 1, cell 2 |
| 01 | 2 | cell 3, cell 4 |
| 10 | 3 | cell 1, cell 4 |
| 11 | 4 | cell 2, cell 3 |

Here, by using grouping information to indicate one or more cell groups, the number of bits occupied by the scheduling information field can be greatly reduced. For example, the cell group may be numbered, and then the cell group may be encoded to obtain grouping information. Compared with coding for each cell individually, coding a group of cells takes up fewer bits. In one embodiment, in the case of separate coding, 3 bits need to be occupied for scheduling 3 cells, but only 1 bit needs to be occupied by the implementation of this embodiment, which reduces the bit overhead.

In one embodiment, the base station may send the grouping information of each cell group to the UE in advance. After the UE receives the grouping information in a certain cell group, it can determine the cell information included in the cell group corresponding to the grouping information.

Figure 11:
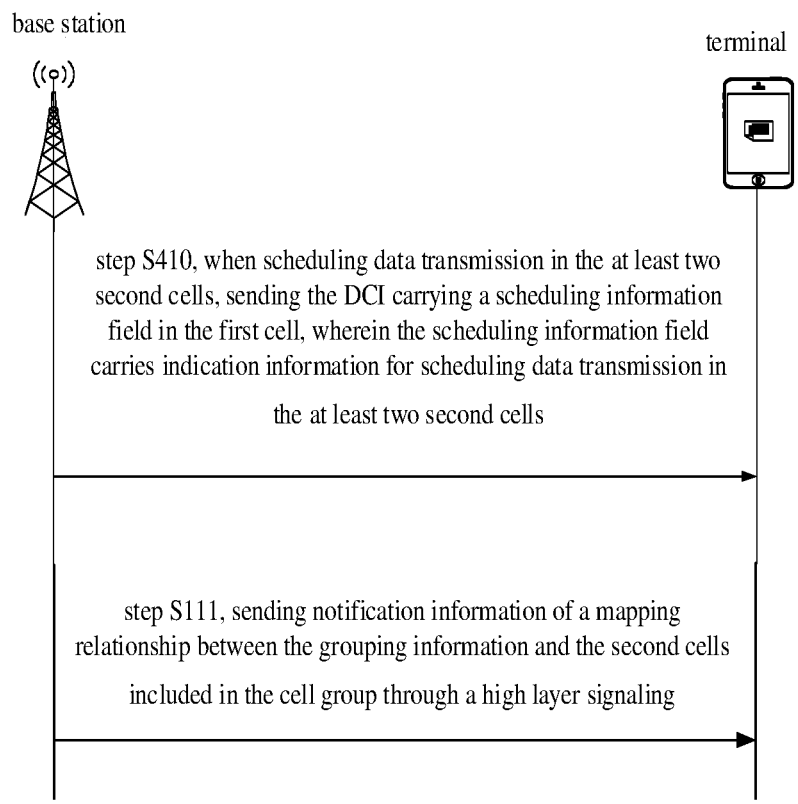
FIG. 11 is a schematic diagram of a transmission scheduling method provided by another embodiment of the present disclosure.

As shown in FIG. 11, another embodiment of the present disclosure provides a transmission scheduling method. The method further includes:
    step S111, sending the notification information of the mapping relationship between the grouping information and the second cells included in the corresponding cell group through a high layer signaling.

In one embodiment, the base station groups the second cells in advance, and sends notification information of the mapping relationship between the grouping information and the second cells included in the corresponding cell group through the high layer signaling. After receiving the notification information, the UE determines the grouping information carried in the DCI based on the notification information, and schedules data transmission in all second cells included in the cell group.

Figure 12:
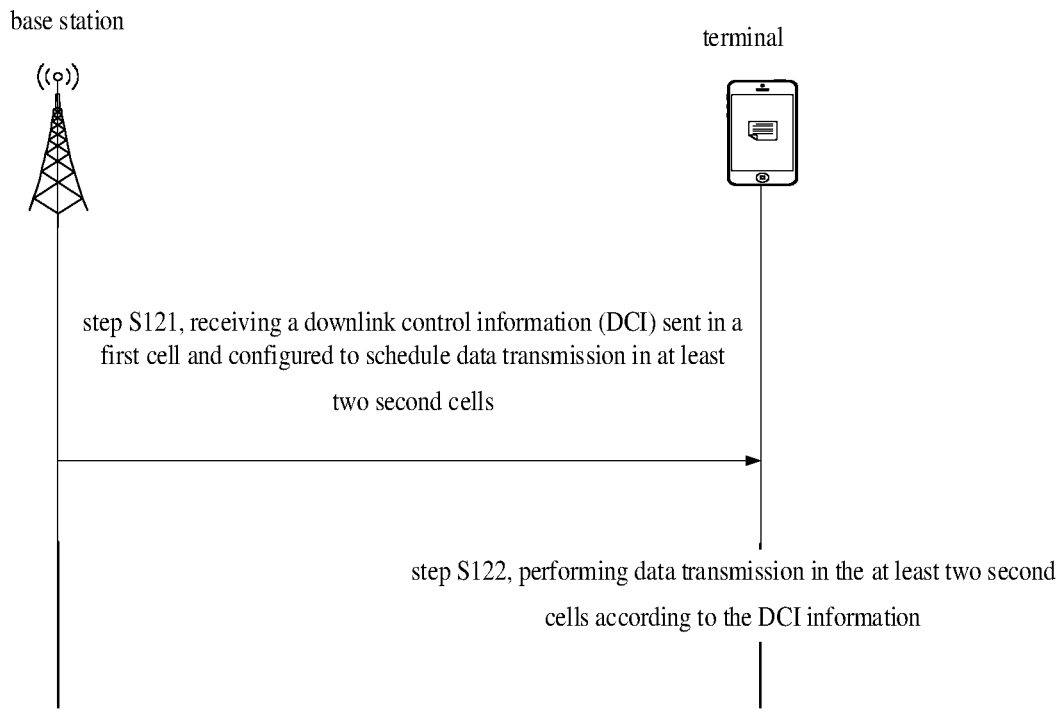
FIG. 12 is a schematic diagram of a transmission scheduling method provided by another embodiment of the present disclosure.

As shown in FIG. 12, another embodiment of the present disclosure provides a transmission scheduling method. The method includes followings.

In step S121, a DCI sent in a first cell and configured to schedules data transmission in at least two second cells is received.

In an embodiment, when the base station sends the DCI to the UE, first, the UE receives the DCI sent by the base station. The DCI is configured to indicate the UE at least one of the following: how to receive the downlink data sent by the base station, how to send the uplink data to the base station, and how to adjust the transmit power. Secondly, after the UE receives the DCI, the UE will perform data transmission according to indication of the DCI. Here, the data transmission may be sending uplink data to the base station, or receiving downlink data sent by the base station.

In one embodiment, each cell may be configured with one carrier. Different cells use different carriers to achieve wireless signal coverage in the cells and complete data transmission in the cells. For example, cell A uses carrier 1 to implement wireless signal coverage in the cell; cell B uses carrier 2 to implement wireless signal coverage in the cell.

In one embodiment, the second cells may be different from the first cell. For example, the first cell is cell A, and the two second cells are cell B and cell C, respectively. In another embodiment, the second cells may include the first cell. For example, the first cell is cell A, and the two second cells are cell A and cell B, respectively.

In this embodiment of the present disclosure, by sending one DCI in the first cell, data transmission can be scheduled in at least two second cells, compared to the case that one DCI can only be schedule data transmission in one cell, the overhead of control signaling in the wireless communication process can be effectively reduced, and the utilization rate of wireless resources can be improved.

In step S122, according to the DCI information, data transmission is performed in the at least two second cells.

Here, the data transmission may be receiving downlink data sent by the base station, or may be sending uplink data to the base station.

Figure 13:
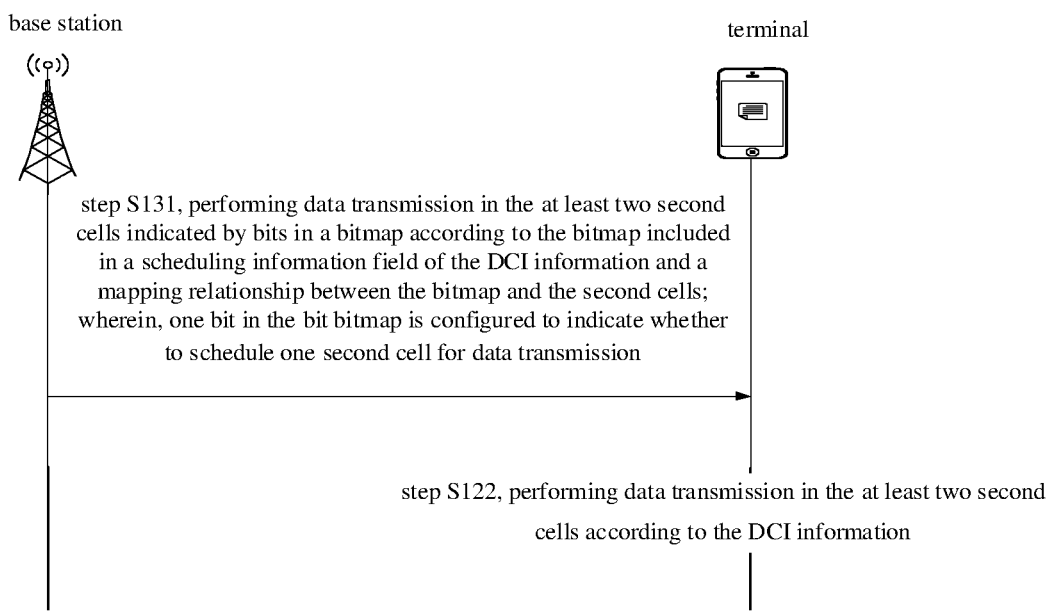
FIG. 13 is a schematic diagram of a transmission scheduling method provided by another embodiment of the present disclosure.

As shown in FIG. 13, another embodiment of the present disclosure provides a transmission scheduling method. In step S122, according to DCI information, performing data transmission in at least two second cells, includes:

step S131, according to the bitmap included in the scheduling information field of the DCI information and the mapping relationship between the bitmap and the second cells, performing data transmission in at least two second cells indicated by bits in the bitmap; wherein, one bit in the bitmap is configured to indicate whether to schedule one second cell for data transmission.

In one embodiment, the bitmap includes 4 bits, the first bit is configured to indicate whether cell 1 is scheduled; the second bit is configured to indicate whether cell 2 is scheduled; the third bit is configured to indicate whether cell 3 is scheduled; the fourth bit is configured to indicate whether cell 4 is scheduled.

In an embodiment, please refer to FIG. 6 again, the values of the four bits of the bitmap are 1, 0, 1, and 1, respectively, which are configured to indicate that data transmission is scheduled to be performed in a total of three cells: cell 1, cell 3, and cell 4.

Figure 14:
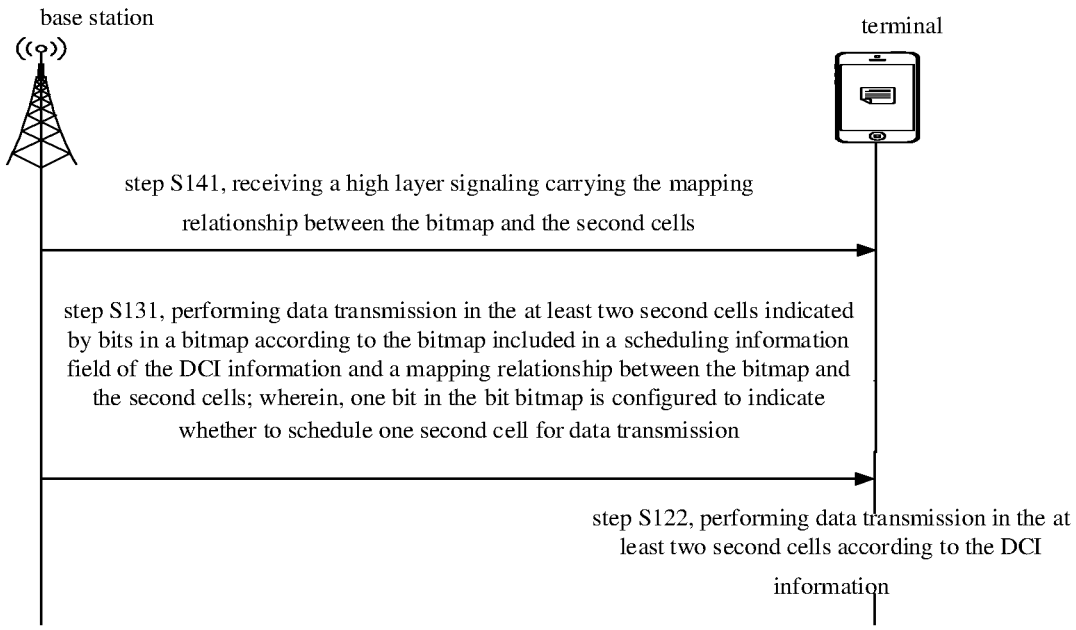
FIG. 14 is a schematic diagram of a transmission scheduling method provided by another embodiment of the present disclosure.

As shown in FIG. 14, another embodiment of the present disclosure provides a transmission scheduling method. In step S131, before according to the bitmap included in the scheduling information field of the DCI information and the mapping relationship between the bitmap and the second cells, performing data transmission in at least two second cells indicated by bits in the bitmap, the method further includes:

step S141, receiving a high layer signaling carrying the mapping relationship between the bitmap and the second cells.

In one embodiment, the high layer signaling may carry encoded information of the mapping relationship between the bitmap and the second cells. For example, the encoded information occupies 4 bits. When the encoded information is "0001", it is used to indicate: the first bit indicates cell 1: the second bit indicates cell 2; the third bit indicates cell 3; the fourth bit indicates cell 4; wherein, cell 1, cell 2, cell 3, and cell 4 belong to the second cells. In this way, the UE can determine the mapping relationship between respective bits of the bitmap and the second cells after receiving the high layer signaling, and determine whether to schedule a second cell for data transmission based on the mapping relationship.

Figure 15:
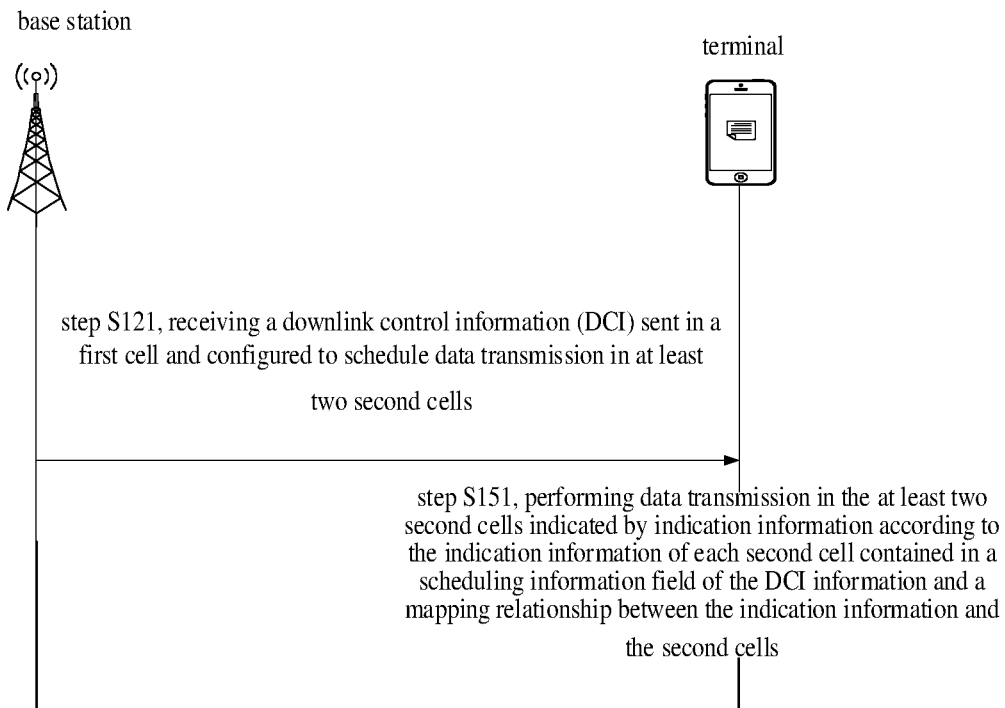
FIG. 15 is a schematic diagram of a transmission scheduling method provided by another embodiment of the present disclosure.

As shown in FIG. 15, another embodiment of the present disclosure provides a transmission scheduling method. In step S122, performing data transmission in at least two second cells according to DCI information, includes:

step S151, according to indication information of each second cell contained in the information field of the DCI information and the mapping relationship between the indication information and the second cells, performing data transmission in at least two second cells indicated by the indication information.

In one embodiment, the indication information may be identification information of the scheduled second cell carried in the scheduling information field. In one embodiment, the identification information of cell 1 is "00", the identification information of cell 2 is "01", the identification information of cell 3 is "10", and the identification information of cell 4 is "11", and when the cell is scheduled, the scheduling information field may directly carry the identification information corresponding to the cell. Please refer to FIG. 8 again, the identification information of cell 1 is "00", and the identification information of cell 3 is "10". When cell 1 and cell 3 are scheduled, the scheduling information field can directly carry the identification information "00" of cell 1 and the identification information "10" of cell 3. Here, the identification information may indicate that the terminal performs data transmission in cell 1 and cell 3.

Figure 16:
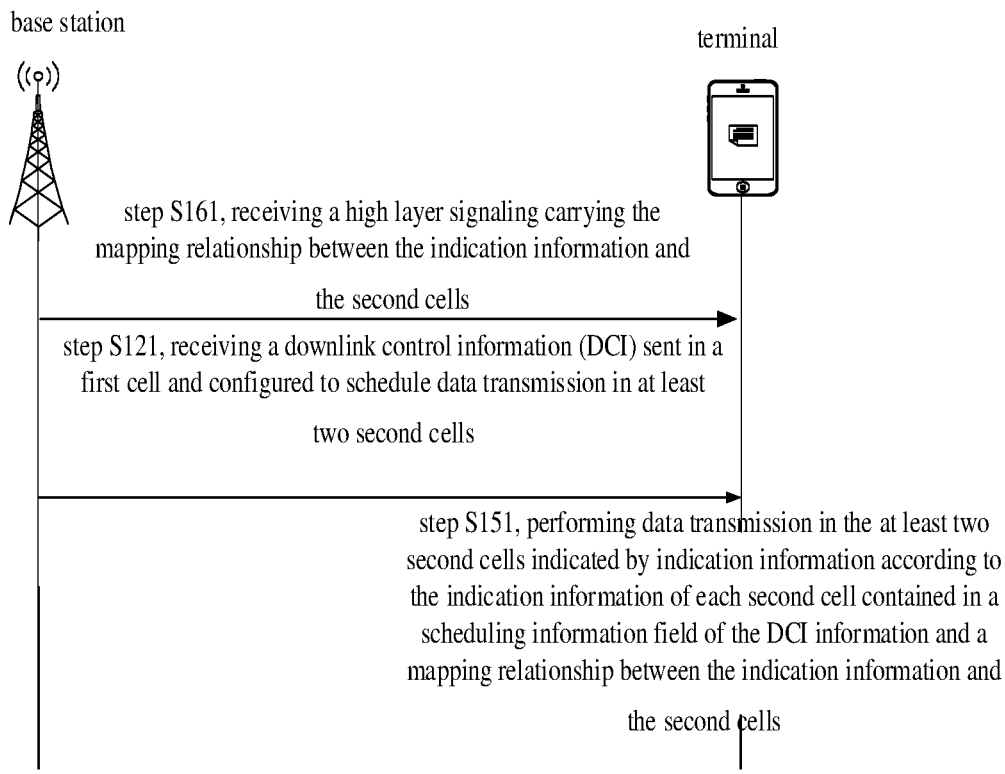
FIG. 16 is a schematic diagram of a transmission scheduling method provided by another embodiment of the present disclosure.

As shown in FIG. 16, another embodiment of the present disclosure provides a transmission scheduling method. In step S151, before performing data transmission in at least two second cells indicated by the indication information according to indication information of each second cell contained in the information field of the DCI information and the mapping relationship between the indication information and the second cells, the method further includes:

step S161, receiving a high layer signaling carrying the mapping relationship between the indication information and the second cells.

In one embodiment, the terminal supports data transmission in 4 second cells, and one DCI schedules the UE to perform data transmission in 2 second cells at most. The UE may learn which second cells are scheduled to perform data transmission based on the mapping relationship between the indication information and the second cells. Here, the base station uses the high layer signaling notification method, and after receiving the high layer signaling, the UE can learn the mapping relationship between the indication information and the second cells.

In one embodiment, the high layer signaling may be signaling of a radio resource control (RRC) layer or signaling of a media access control (MAC) layer, for example, a RRC signaling, a MAC Control Element (CE, Control Element) signaling, etc.

Here, the UE can determine the mapping relationship between the indication information and the second cells after receiving the high layer signaling, and determine to schedule the corresponding second cells for data transmission based on the mapping relationship.

In one embodiment, the mapping relationship includes:
  a first type of mapping relationship, wherein one indication information map to one second cell;
  a second type of mapping relationship, wherein one indication information map to one or more second cells.

In an embodiment, please refer to Table 2 again, when the value of the scheduling information field includes "00", the indication information indicates that cell 1 is scheduled; when the value of the scheduling information field includes "01", the indication information indicates that cell 2 is scheduled Scheduling; when the value of the scheduling information field includes "10", the indication information indicates that cell 3 is scheduled; when the value of the scheduling information field includes "11", the indication information indicates that cell 4 is scheduled; wherein, cell 1, cell 2, Both cell 3 and cell 4 are second cells.

In one embodiment, please refer to Table 3 again, when the value of the scheduling information field includes "000", the indication information indicates that cell 1 is scheduled; when the value of the scheduling information field includes "001", the indication information indicates that cell 2 is scheduled; when the value of the scheduling information field includes "010", the indication information indicates that cell 3 is scheduled; when the value of the scheduling information field includes "011", the indication information indicates that cell 4 is scheduled; when the value of the scheduling information field includes "100", the indication information indicates that cell 1 and cell 2 are scheduled; when the value of the scheduling information field includes "101", the indication information indicates that cell 1 and cell 3 are scheduled; when the value of the scheduling information field includes "110", the indication information indicates that cell 1 and cell 4 are scheduled; when the value of the scheduling information field includes "111", the indication information indicates that cell 2 and cell 3 are scheduled; wherein, cell 1, cell 2, cell 3 and cell 4 are the second cells.

In one embodiment, the number of bits occupied by each second cell in the scheduling information field may be determined based on how many second cells the UE supports to perform data transmission in or how many second cells one DCI schedules the UE to perform data transmission in at most.

Referring to FIG. 10 again, in one embodiment, the value of the scheduling information field in the DCI includes "110", and the indication information indicates that cell 1 and cell 4 are scheduled.

Figure 17:
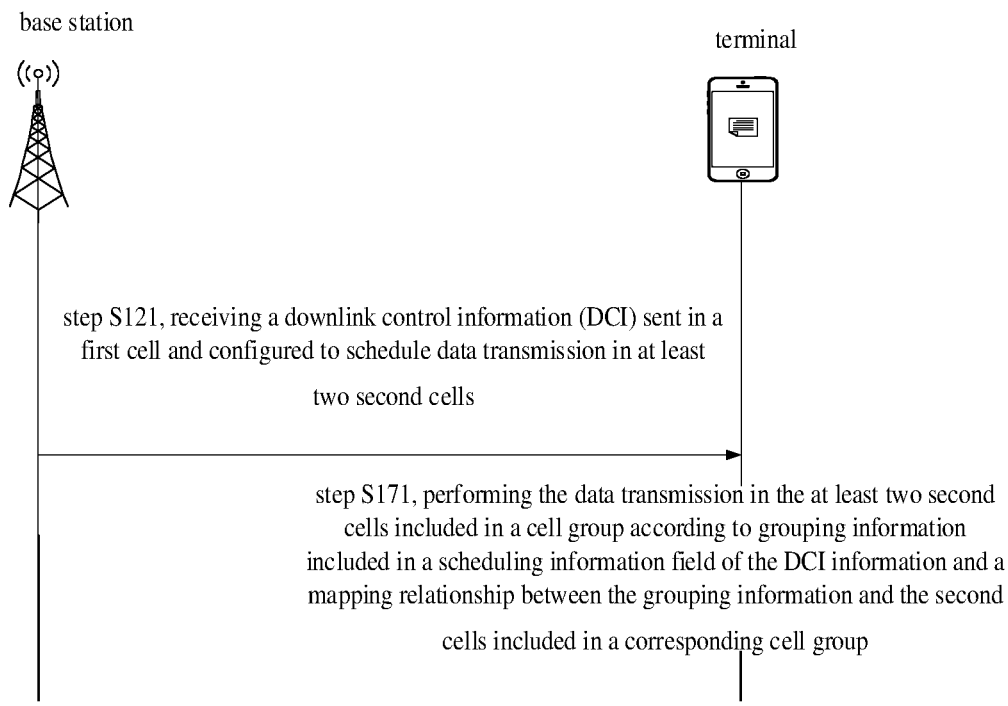
FIG. 17 is a schematic diagram of a transmission scheduling method provided by another embodiment of the present disclosure.

As shown in FIG. 17, another embodiment of the present disclosure provides a transmission scheduling method. In step S122, performing data transmission in at least two second cells according to DCI information, includes:
  step S171, performing data transmission in at least two cells included in the cell group according to the grouping information included in the information field of the DCI information and the mapping relationship between the grouping information and the second cells included in the corresponding cell group.

In an embodiment, please refer to Table 4 again, when the information field value included in the scheduling information field is "00", the grouping information indicates that data transmission is scheduled to be performed in cell 1 and cell 2 included in the cell group with group number 1; when the information field value included in the scheduling information field is "01", the grouping information indicates that data transmission is scheduled to be performed in cell 3 and cell 4 contained in the cell group with group number 2; when the information field value included in the scheduling information field is "10", the grouping information indicates that the data transmission is scheduled to be performed in cell 1 and cell 4 included in the cell group with group number 3; when the information field value included in the scheduling information field is "11", the grouping information indicates that the data transmission is scheduled to be performed in cell 2 and cell 3 included in the cell group with the group number 4; wherein, the cell 1, the cell 2, the cell 3 and the cell 4 are the second cells.

Figure 18:
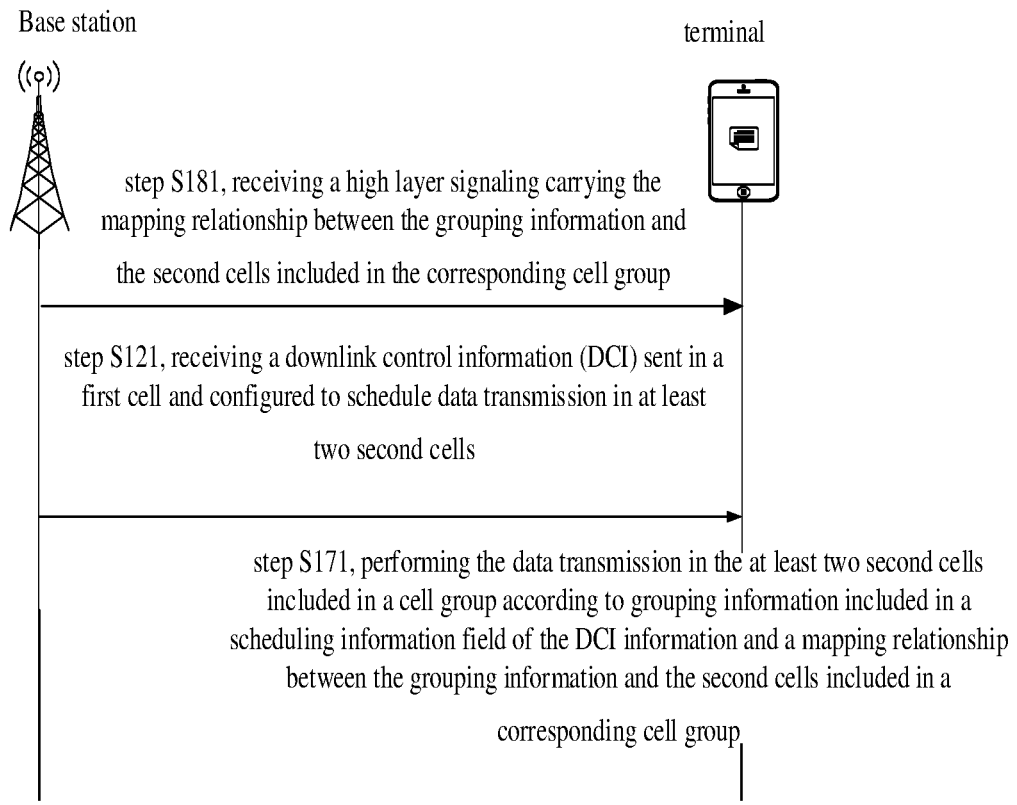
FIG. 18 is a schematic diagram of a transmission scheduling method provided by another embodiment of the present disclosure.

As shown in FIG. 18, another embodiment of the present disclosure provides a transmission scheduling method. In step S171, before performing data transmission in at least two cells included in the cell group according to the grouping information included in the information field of the DCI information and the mapping relationship between the grouping information and the second cells included in the corresponding cell group, the method further includes:
  step S181, receiving a high layer signaling carrying the mapping relationship between the grouping information and the second cells included in the corresponding cell group.

In one embodiment, the base station groups the second cells in advance, and sends notification information of the mapping relationship between the grouping information and the second cells included in the corresponding cell group through the high layer signaling. After receiving the notification information, the grouping information carried in the DCI is determined based on the notification information, and data transmission is scheduled to be performed in all second cells included in a cell group.

Figure 19:
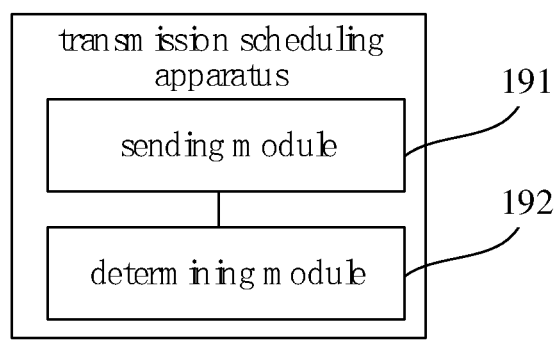
FIG. 19 is a schematic diagram of a transmission scheduling apparatus according to an embodiment of the present disclosure.

As shown in FIG. 19, an embodiment of the present disclosure provides a transmission scheduling apparatus. The apparatus includes a sending module 191. The sending module 191 is configured to send a DCI in a first cell for scheduling data transmission in at least two second cells.

In one embodiment, the sending module 191 is further configured to, when scheduling data transmission in at least two second cells, send the DCI carrying a scheduling information field in the first cell, wherein the scheduling information field carries indication information for scheduling data transmission in at least two second cells.

In one embodiment, the sending module 191 is further configured so that the scheduling information field is located at a fixed position of the DCI; or an information field length of the scheduling information field is a fixed length; or the scheduling information field is located at a fixed position of the DCI, and an information field length of the scheduling information field is a fixed length.

In one embodiment, the apparatus further includes a determining module 192, wherein the determining module is configured to determine at least one of the position or the information field length of the scheduling information field in the DCI according to configuration information of the scheduling information field.

In one embodiment, the sending module 191 is further configured so that the scheduling information field includes a bitmap, wherein a bit in the bitmap is configured to indicate whether to schedule a second cell for data transmission.

In one embodiment, the sending module 191 is further configured to send a notification message of the mapping relationship between the bitmap and the second cells through a high layer signaling.

In an embodiment, the sending module 191 is further configured so that the scheduling information field includes the indication information of each second cell.

In one embodiment, the sending module 191 is further configured to send notification information of the mapping relationship between the indication information and the second cells through a high layer signaling.

In one embodiment, the sending module 191 is further configured so that the mapping relationship includes: a first type of mapping relationship, in which one indication information map to one second cell; and a second type of mapping relationship, in which one indication information map to one or more second cells.

In one embodiment, the sending module 191 is further configured so that the scheduling information field includes grouping information for indicating one or more cell groups; wherein one cell group includes one or more second cells.

In one embodiment, the sending module 191 is further configured to send notification information of the mapping relationship between the grouping information and the second cells included in the corresponding cell group through a high layer signaling.

Figure 20:
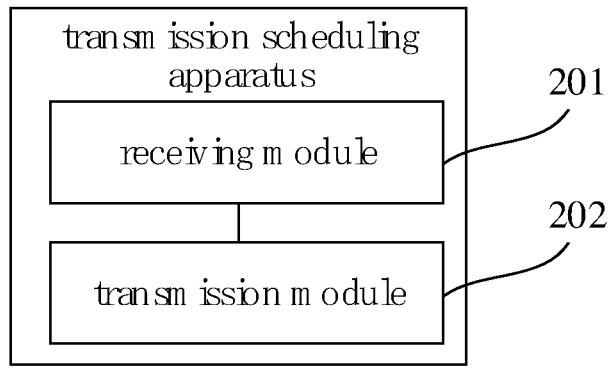
FIG. 20 is a schematic diagram of a transmission scheduling apparatus according to another embodiment of the present disclosure.

As shown in FIG. 20, another embodiment of the present disclosure provides a transmission scheduling apparatus. The apparatus includes a receiving module 201 and a transmission module 202, wherein, The receiving module 201 is configured to receive a DCI sent in a first cell and configured to schedule data transmission in at least two second cells.

The transmission module 202 is configured to perform data transmission in at least two cells according to the DCI information.

In one embodiment, the transmission module 202 is further configured to, according to a bitmap included in a scheduling information field of the DCI information and a mapping relationship between the bitmap and the second cells, perform data transmission in at least two second cells indicated by bits in the bitmap; wherein, one bit in the bitmap is configured to indicate whether to schedule one second cell for data transmission.

In one embodiment, the receiving module 201 is further configured to receive a high layer signaling carrying the mapping relationship between the bitmap and the second cells.

In one embodiment, the transmission module 202 is further configured to, according to indication information of each second cell contained in the information field of the DCI information and the mapping relationship between the indication information and the second cells, perform data transmission in at least two second cells indicated by the indication information.

In one embodiment, the receiving module 201 is further configured to receive a high layer signaling carrying the mapping relationship between the indication information and the second cells.

In an embodiment, the receiving module 201 is further configured so that the mapping relationship includes: a first type of mapping relationship, in which one indication information map to one second cell; and a second type of mapping relationship, in which one indication information map to one or more second cells.

In one embodiment, the transmission module 202 is further configured to, according to grouping information included in the information field of the DCI information and the mapping relationship between the grouping information and the second cells included in the corresponding cell group, perform data transmission in at least two second cells included in the cell group.

In one embodiment, the receiving module 201 is further configured to receive a high layer signaling carrying the mapping relationship between the grouping information and the second cells included in the corresponding cell group.

Embodiments of the present disclosure also provide a communication device, including:
an antenna;
a memory;
a processor, connected to the antenna and the memory respectively, and configured to control the antenna to send and receive wireless signals by executing an executable program stored in the memory, and can implement the steps of the transmission scheduling method provided in any of the foregoing embodiments.

The communication device provided in this embodiment may be the aforementioned terminal or base station. The terminal may be various human-mounted terminal or vehicle-mounted terminal. The base station may be various types of base station, for example, a 4G base station or a 5G base station.

The antenna may be various types of antenna, for example, a mobile antenna such as a 3G antenna, a 4G antenna, or a 5G antenna; the antenna may also include a WiFi antenna or a wireless charging antenna.

The memory may include various types of storage media, which are non-transitory computer storage media that can continue to memorize the information stored thereon after the communication device is powered off.

The processor may be connected to the antenna and the memory through a bus or the like, and is configured to read an executable program stored in the memory, for example, at least one of the methods shown in any embodiment of the present disclosure.

Embodiments of the present disclosure further provide a non-transitory computer-readable storage medium. The non-transitory computer-readable storage medium stores an executable program, wherein, when the executable program is executed by a processor, the transmission scheduling provided in any of the foregoing embodiments is implemented, for example, at least one of the methods shown in any of the embodiments of the present disclosure.

Figure 21:
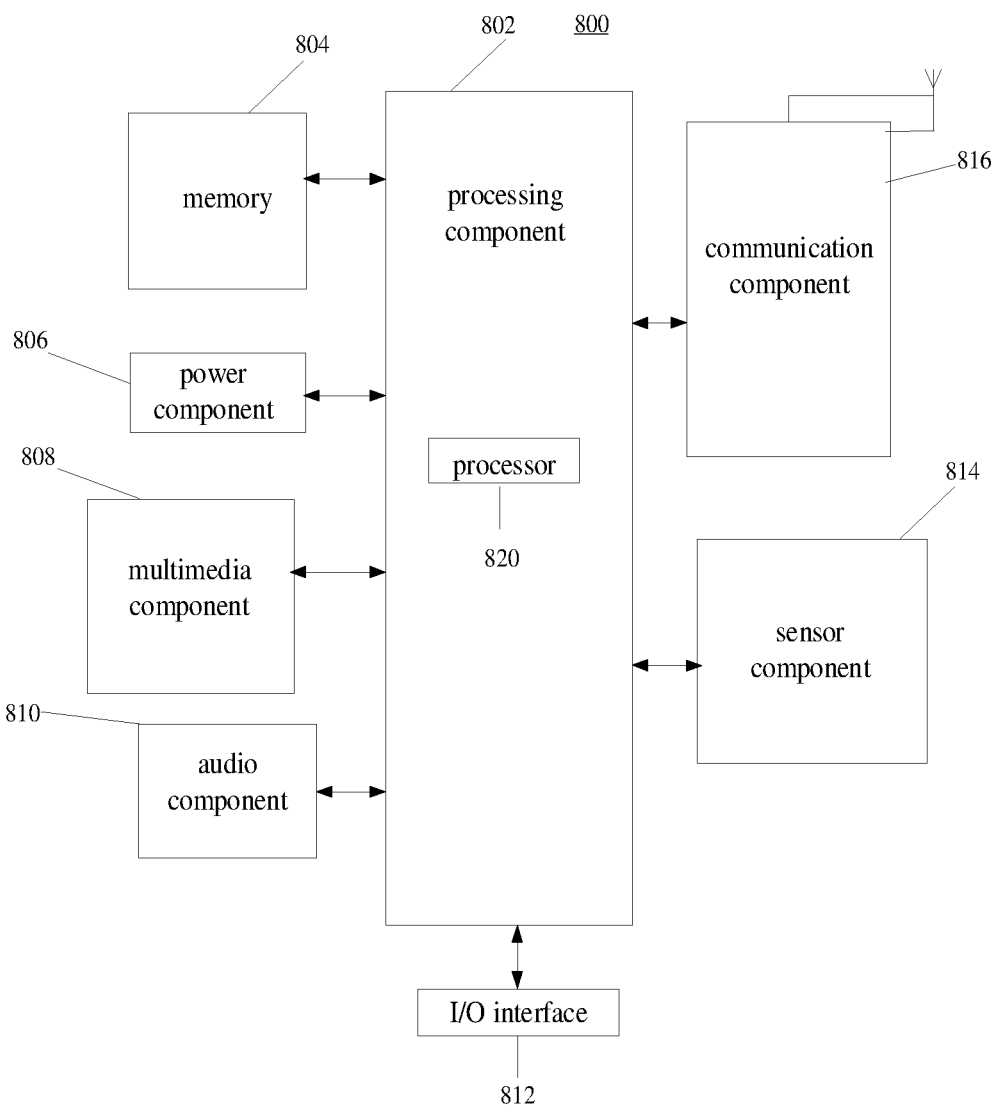
FIG. 21 is a schematic diagram of a terminal according to an embodiment of the present disclosure.

As shown in FIG. 21, an embodiment of the present disclosure provides a structure of a terminal.

Referring to the terminal 800 shown in FIG. 21, this embodiment provides a terminal 800. The terminal specifically may be a mobile phone, a computer, a digital broadcasting terminal, a messaging transceiver, a game console, a tablet device, a medical equipment, a fitness equipment, a personal digital assistant, etc.

Referring to FIG. 21, the terminal 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the terminal 800, such as the operations associated with display, data communications, telephone call, camera operations, and recording operations. The processing component 802 may include one or more processors Z20 to execute instructions so as to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, videos, etc. The memory 804 may be implemented using any type of volatile or nonvolatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input an audio signal. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an opened/closed status of the terminal 800, relative positioning of components (e.g., the display and the keypad) of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the terminal 800 and other apparatus. The terminal 800 can access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an embodiment, there is also provided a non-transitory computer-readable storage medium including instructions, such as a memory 804 including instructions, which are executable by the processor 820 of the terminal 800 to perform the above method. For example, the non-transitory computer-readable storage medium may be ROM, random access memory (RAM). CD-ROM, magnetic tape, floppy disk, optical data storage device, and the like.

The terminal may be used to implement the aforementioned method, for example, the method of any embodiment of the present disclosure.

Figure 22:
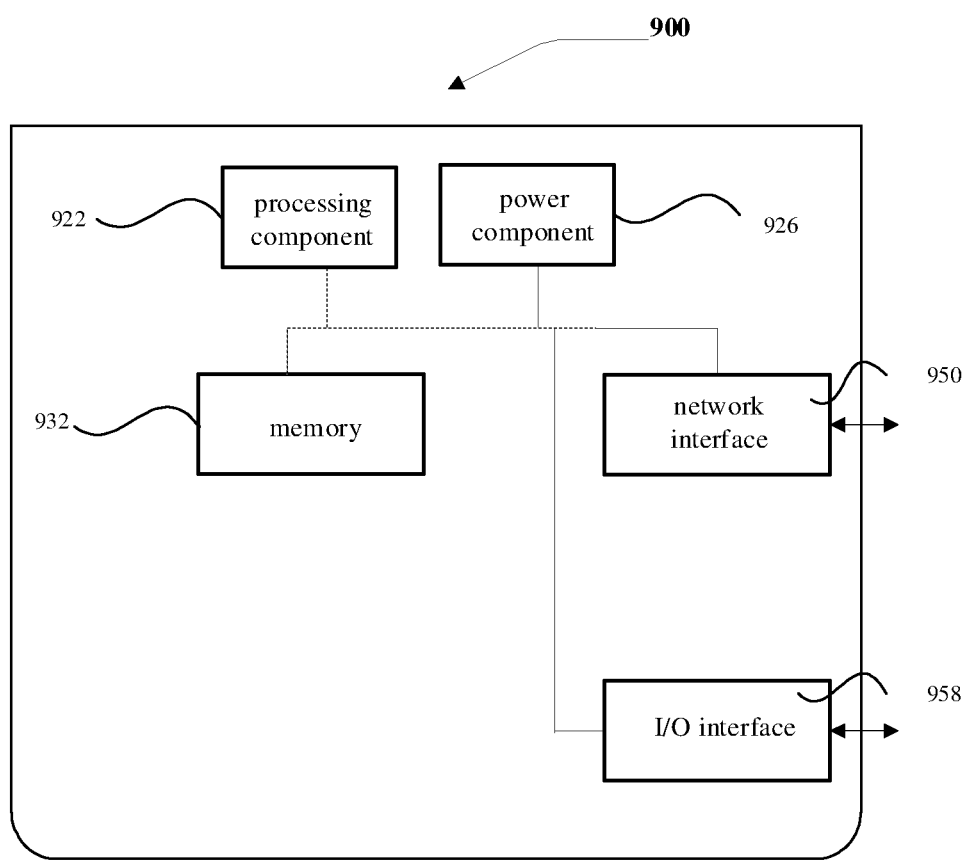
FIG. 22 is a schematic diagram of a base station according to an embodiment of the present disclosure.

As shown in FIG. 22, an embodiment of the present disclosure provides a structure of a base station. For example, the base station 900 may be provided as a network-side device. Referring to FIG. 22, the base station 900 includes a processing component 922, which further includes one or more processors, and a memory resource represented by a memory 932 for storing instructions executable by the processing component 922, such as application programs. The application programs stored in the memory 932 may include one or more modules, each corresponding to a set of instructions. In addition, the processing component 922 is configured to execute the instructions to perform any of the foregoing methods, e.g., as in any of the embodiments of the present disclosure.

The base station 900 may further include a power component 926 configured to perform power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

The wireless network interface 950 includes, but is not limited to, the antenna of the aforementioned communication device. Other embodiments of the present application will readily occur to those skilled in the art upon consideration of the specification and practice of the invention disclosed herein. This application is intended to cover any variations, uses, or adaptations of the present application that follow the general principles of the present application and include common knowledge or conventional techniques in the art not disclosed by this disclosure. The specification and examples are to be regarded as exemplary only, with the true scope and spirit of the application being indicated by the following claims.

It is to be understood that the present application is not limited to the precise structures described above and illustrated in the accompanying drawings and that various modifications and changes may be made without departing from the scope thereof. The scope of the application is limited only by the appended claims.

What is claimed is:

1. A transmission scheduling method, comprising:
sending notification information of a mapping relationship between indication information and second cells through a high layer signaling, wherein the mapping relationship comprises: one indication information mapping to one or more second cells; and
sending in a first cell, downlink control information (DCI) for scheduling data transmission in at least two second cells;
wherein the DCI carries a scheduling information field, and the scheduling information field comprises the indication information of each second cell;
wherein sending in the first cell, the DCI for scheduling data transmission in the at least two second cells comprises:
when scheduling data transmission in the at least two second cells, sending the DCI in the first cell, wherein the scheduling information field carries indication information for scheduling data transmission in the at least two second cells, and the DCI is used for performing the data transmission in the at least two second cells according to the DCI information;
wherein performing the data transmission in the at least two second cells according to the DCI information further comprises:
performing the data transmission in the at least two second cells indicated by the indication information according to the indication information of each second cell contained in the scheduling information field of the DCI and the mapping relationship between the indication information and the at least two second cells.

2. The method of claim 1, wherein,
the scheduling information field is located at a fixed position of the DCI; or an information field length of the scheduling information field is a fixed length; or
the scheduling information field is located at the fixed position of the DCI, and the information field length of the scheduling information field is the fixed length.

3. The method of claim 1, further comprising:
determining at least one of a position or an information field length of the scheduling information field in the DCI according to configuration information of the scheduling information field.

4. The method of claim 1, wherein the scheduling information field comprises:
grouping information configured to indicate one or more cell groups; wherein, one cell group comprises one or more second cells.

5. The method of claim 4, further comprising:
sending notification information of a mapping relationship between the grouping information and the second cells included in the cell group through a high layer signaling.

6. A transmission scheduling method, comprising:
receiving a high layer signaling carrying a mapping relationship between indication information and second cells cell, wherein the mapping relationship comprises: one indication information mapping to one or more second cells;
receiving downlink control information (DCI) sent in a first cell and configured to schedule data transmission in at least two second cells, wherein the DCI carries a scheduling information field, and the scheduling information field comprises indication information of each second; and
performing the data transmission in the at least two second cells according to the DCI information;
wherein performing the data transmission in the at least two second cells according to the DCI information comprises:
performing the data transmission in the at least two second cells indicated by indication information according to the indication information of each second cell contained in the scheduling information field of the DCI information and the mapping relationship between the indication information and the at least two second cells.

7. The method of claim 6, wherein performing the data transmission in the at least two second cells according to the DCI information comprises:
performing the data transmission in the at least two second cells included in a cell group according to grouping information included in a scheduling information field of the DCI information and a mapping relationship between the grouping information and the second cells included in a corresponding cell group.

8. The method of claim 7, wherein before performing the data transmission in the at least two second cells included in a cell group according to grouping information included in a scheduling information field of the DCI information and a mapping relationship between the grouping information and the second cells included in a corresponding cell group, the method further comprises:
receiving a high layer signaling carrying the mapping relationship between the grouping information and the second cells included in the corresponding cell group.

9. A communication device, comprising:
an antenna;
a memory; and a processor, connected to the antenna and the memory respectively, and configured to control the antenna to:

send notification information of a mapping relationship between indication information and second cells through a high layer signaling, wherein the mapping relationship comprises: one indication information mapping to one or more second cells; and send in a first cell, downlink control information (DCI) for scheduling data transmission in at least two second cells;

wherein the DCI carries a scheduling information field, and the scheduling information field comprises the indication information of each second cell;

wherein the processor is further configured to control the antenna to:

send the DCI in the first cell when scheduling data transmission in the at least two second cells, wherein the scheduling information field carries indication information for scheduling data transmission in the at least two second cells, and the DCI is used for performing the data transmission in the at least two second cells according to the DCI information; and perform the data transmission in the at least two second cells indicated by the indication information according to the indication information of each second cell contained in the scheduling information field of the DCI and the mapping relationship between the indication information and the at least two second cells.

* * * * *